UNITED STATES PATENT OFFICE.

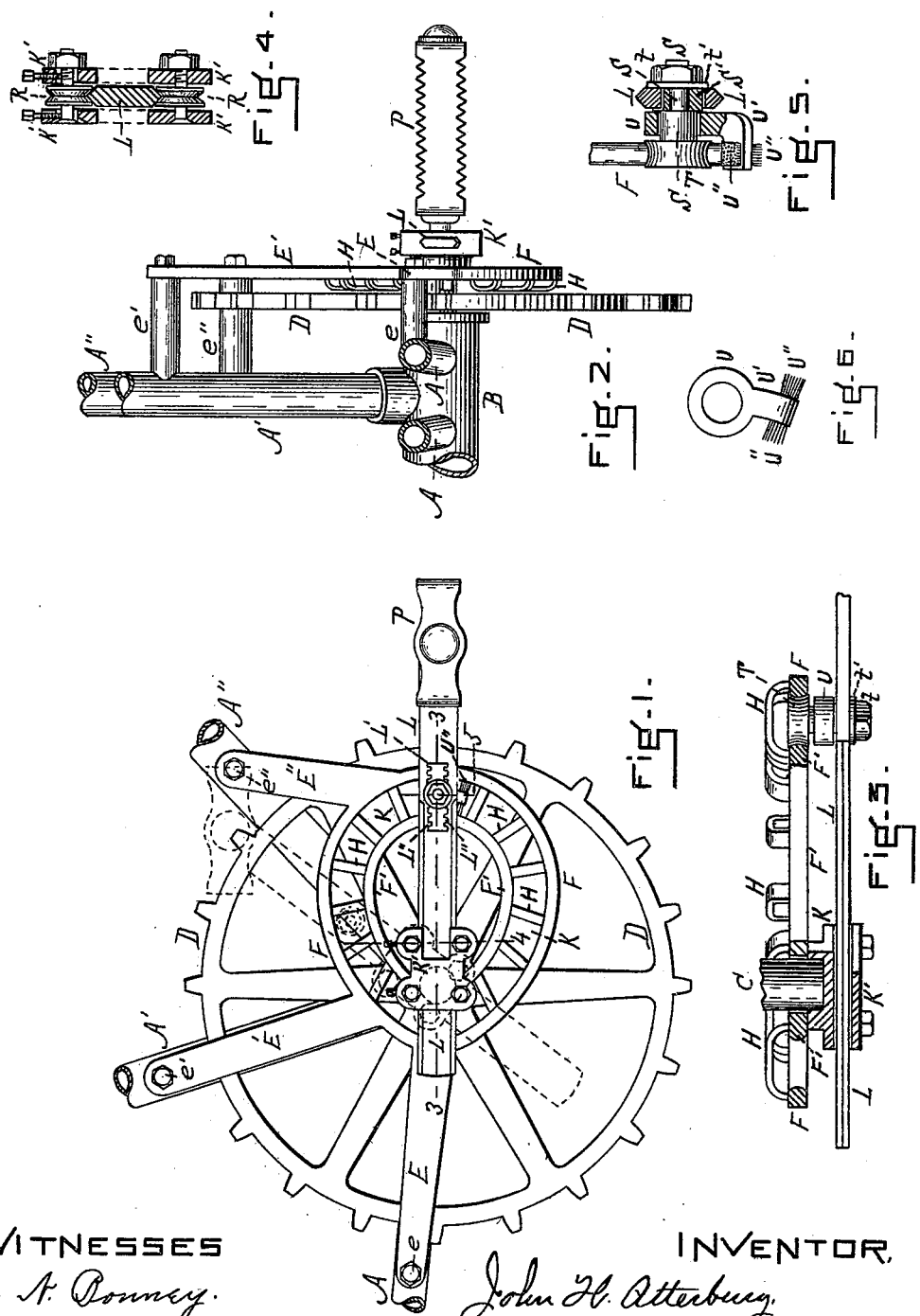

JOHN H. ATTERBURY, OF NEEDHAM, MASSACHUSETTS.

CRANK MECHANISM FOR BICYCLES, &c.

SPECIFICATION forming part of Letters Patent No. 623,863, dated April 25, 1899.

Application filed January 18, 1899. Serial No. 702,530. (No model.)

*To all whom it may concern:*

Be it known that I, JOHN H. ATTERBURY, a citizen of the United States, residing at Needham, in the county of Norfolk and State of Massachusetts, have invented new and useful Improvements in Crank Mechanisms for Bicycles and other Pedomotive Vehicles, of which the following is a specification.

This invention relates to that class of bicycles or other velocipedes in which the pedal-crank is elongated and its leverage thereby increased as the pedal is moved downward from a vertical to a horizontal position and shortened and decreased as the movement of the pedal continues from the horizontal to the lowest downward position, and the elongation again commenced before the pedal reaches its highest point; and the invention consists in the novel construction and arrangement of parts, whereby such result is produced in the most economical manner and the device rendered light, durable, and practicable.

The nature of the invention is fully described in detail below and illustrated in the accompanying drawings, in which—

Figure 1 is a side elevation showing my improved crank mechanism in position upon a bicycle, a sufficient portion of the frame of which is represented. Fig. 2 is an end view of the mechanism looking from the rear. Fig. 3 is an enlarged horizontal section taken on line 3, Fig. 1. Fig. 4 is a vertical section taken on line 4, Fig. 1. Fig. 5 is a vertical section taken on line 5, Fig. 1. Fig. 6 is a detail in elevation, showing the cleaning device.

Similar letters of reference indicate corresponding parts.

A represents the rear fork, A' the post which extends up to the saddle, and A" the post which extends to the front fork, all radiating or extending from the crank-hanger B in the usual manner.

C is the driving-shaft, fast upon which is the large front sprocket-wheel D.

Rigidly secured to the parts A, A', and A" of the frame of the machine by means of the arms E E' E" and connecting-rods $e$ $e'$ $e''$, respectively, is a cam integral with said arms. This cam consists of the substantially pear-shaped or approximately elliptical guide-rings F F', connected by the series of cross-bars H. These rings produce a cam-groove or cam-slot K of even width, substantially pear-shaped, set on a vertical plane and with its horizontal diameter longer than its vertical diameter. The cross-bars or connecting-bars H are curved rearward or inward toward the machine, and thus afford ample space for the part which travels in the cam-groove or cam-slot, at the same time furnishing sufficient strength with economy of weight, it being evident that this construction is very much lighter than a solid plate formed with a cam-groove.

K' is a hollow metallic frame or structure rigid on or integral with the driving-shaft C and constituting a slideway for the bar L, which together with said frame constitutes a crank for the pedal P, secured to the outer end thereof in the usual manner. This bar L slides freely in the slideway K', its upper and lower edges being V-shaped, as shown in Fig. 4, to fit the peripheries of the antifriction wheels or rollers R, supported by and within the frame K' above and below said bar L. The bar or crank L is provided with the horizontal slot L', whose upper and lower edges L" are formed with suitable notches for the purpose of adjustably receiving the stud S, which is provided with teeth S', adapted to fit into said notches, and carries a roller T, which travels within the cam-slot K, and whose periphery is concaved or grooved in order to fit the correspondingly-shaped inner edges of the guide-rings F F', Figs. 3 and 5, which constitute the cam. This stud is suitably secured to the bar L at its outer end by a nut $t$ and washer $t'$.

As will readily be seen, as the pedal and crank descend from the position indicated in broken lines in Fig. 1 to that indicated in full lines in the same figure the bar or crank L is slid forward and practically lengthened and the leverage increased by the roller T in the cam-slot. As the bar descends still farther its throw is gradually shortened, and as it rises the throw shortens still more until after it has passed a horizontal position, when the throw begins to lengthen, and the bar or crank continues to lengthen until the forward horizontal position is again reached. Thus the crank as it makes a complete revolution may vary from, say, a seven-inch to a thirteen-inch throw.

In order that the inner surfaces of the guide-rings F F' may be kept clear from dust and dirt, a brush is provided which travels in advance of the roller T, said brush consisting of a ring U on the stud S, a body portion U', extending from said ring and bending into the cam-slot K, and oppositely-extending bristles U". (See Figs. 1, 5, and 6.)

Having thus fully described my invention, what I claim, and desire to secure by Letters Patent, is—

1. In a crank mechanism of the character described for bicycles and other velocipedes, the substantially pear-shaped guide-rings F, F' and the bars H connecting said rings, said rings and bars constituting a cam provided with a pear-shaped cam-slot set on a vertical plane and with its longest diameter on a horizontal plane; the arms E, E', E" connecting said cam with the frame of the machine; the crank-shaft C properly supported in the hanger; the hollow frame or slideway K' supported by the crank-shaft; the bar or crank L supported by and sliding in said frame or slideway and provided with the horizontal slot L' formed with the notched sides L"; the stud S provided with the teeth S' and roller T engaged by the cam-slot; and the pedal suitably secured to the outer end of said bar L, substantially as and for the purpose set forth.

2. In a crank mechanism of the character described for bicycles and other velocipedes, the substantially pear-shaped guide-rings F, F' and inwardly-curved bars H connecting said rings, said rings and bars constituting a cam provided with a pear-shaped cam-slot set on a vertical plane and with its longest diameter on a horizontal plane; arms connecting said cam with the frame of the machine; the crank-shaft C properly supported in the hanger; the hollow frame or slideway K' supported by the crank-shaft and provided with upper and lower pairs of grooved rolls R; the bar or crank L formed on its upper and lower edges into suitable shape to fit said rolls and slide in said frame or slideway and provided with the horizontal slot L'; the stud S provided with the roller T grooved to travel in the cam-slot and engage with said rings F, F'; the pedal suitably secured to the outer end of said bar L; and the cleaning mechanism consisting of the ring U on said stud, bent holder U' and brushes U", all substantially as and for the purpose set forth.

JOHN H. ATTERBURY.

Witnesses:
HENRY W. WILLIAMS,
A. N. BONNEY.